Patented Oct. 5, 1926.

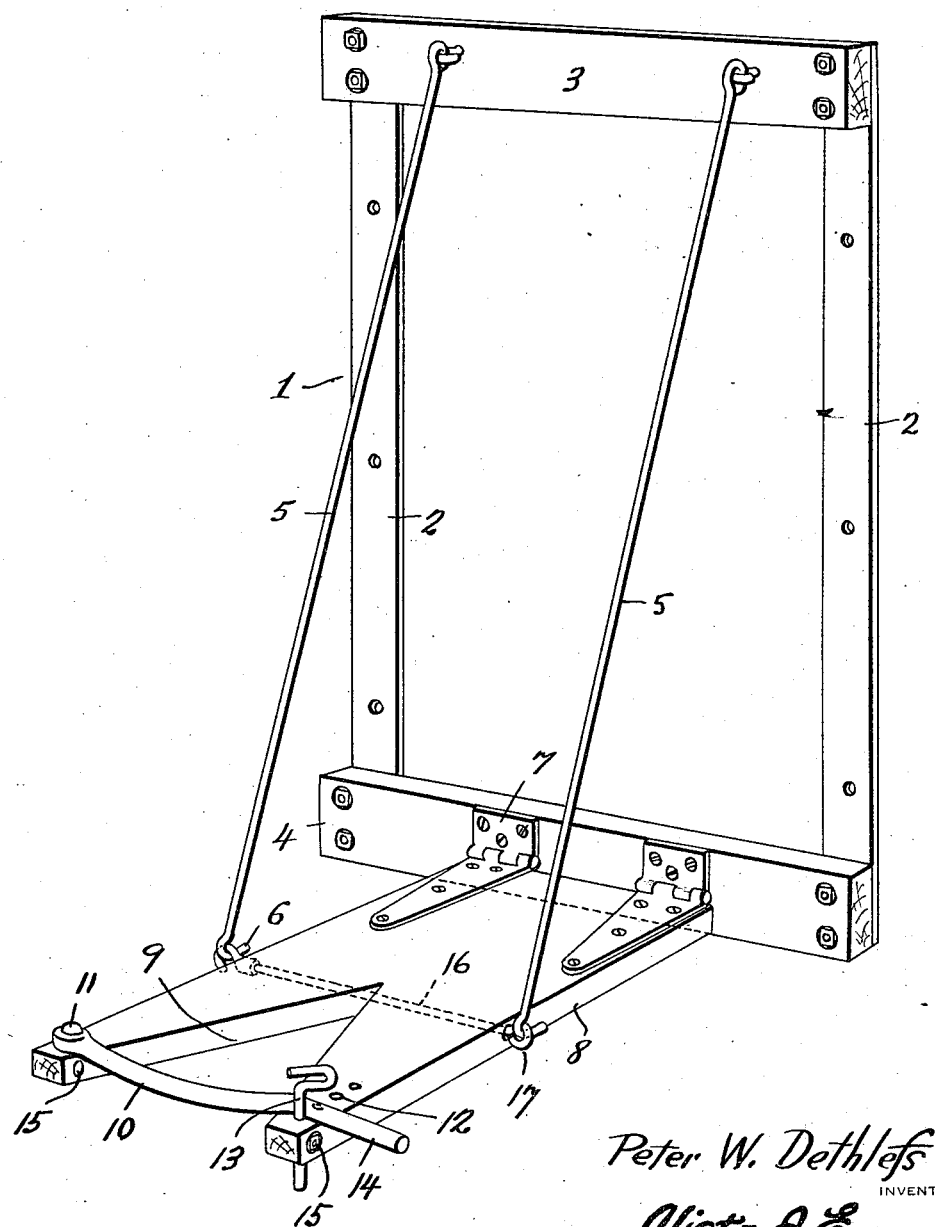

1,602,342

UNITED STATES PATENT OFFICE.

PETER WILLIAM DETHLEFS, OF BATTLE CREEK, IOWA.

HOG HOLDER.

Application filed April 12, 1926. Serial No. 101,527.

My present invention has reference to an apparatus for effectively holding hogs in a position whereby the mouth and snout thereof will be sustained in an upright direction to facilitate the ringing, vaccinating or dosing the hog with a medicament.

A further object is the provision of an apparatus for this purpose which comprises a frame secured on an upright support and having hingedly secured to the lower portion thereof a plate, which may be in the nature of a wooden board that has from its outer end a V-shaped notch, means being provided for effectively supporting the board or plate at an outward angle with respect to the frame, while there is a pivotally supported gate bar for bridging the notch and the neck of the hog designed to be arranged in said notch so that the hog is thus effectively supported in an upright position from the said board or plate and when not in use the board or plate is folded into the frame so that only a small space is then occupied by the improvement.

The drawing which accompanies and forms part of this application illustrates a satisfactory embodiment of my improvement.

Referring now to the drawing in detail, the numeral 1 indicates a substantially rectangular frame. The frame is substantially formed of metal plates 2 that have secured adjacent to their ends and on their outer faces, upper and lower cross beams or plates 3 and 4, respectively. The frame is bolted or otherwise effectively secured on a vertical support, such as uprights in a piggery or the like, and the upper beam or plate 3 has loosely connected thereto spaced rods 5 that have their free ends hooked, as at 6.

Hingedly secured, as at 7, to the lower beam or plate 4, there is a plate 8. Preferably, but not necessarily, the plate 8 is in the nature of a wooden board, and the hinged end thereof is designed, when the plate is swung rightangularly on the frame, to contact with the beam 4. The plate or board 8 has a V-shaped notch 9 entering from its outer end, and secured on the plate, adjacent to the outer end thereof and to one side of the V-shaped notch, there is a pivotally supported gate bar 10. The pivot for the bar is indicated for distinction by the numeral 11, and the opposite side of the plate or board 8 is formed with any desired number of spaced openings 12, and through any one of these openings there is adapted to be passed a headed pin 13 that contacts with the straight end of the gate bar for preventing the outward swinging thereof. The gate bar is preferably round in cross section, and has its major portion, from its pivoted end arched, the outer end 14 of the said gate bar being straight.

When the member 9 is of wood the same is reinforced by transverse metal members 15—15 and 16. The member 16 which is arranged at or adjacent to the inner portion of the notch, has its projecting ends formed with eyes 17, and these eyes are designed to be engaged by the hooks 6 on the rods 5 when the member 8 is in operative position.

In practice the member 8 is swung to the position illustrated by the drawings, and the gate bar 10 is swung to open position. The operator grabs the hog and inserts his neck in the V-shaped notch and after swinging the gate to closed position and latching the same, the hog is suspended entirely off the ground so that his snout is in upright position whereby the operator can conveniently ring the hog, vaccinate or dose the animal with medicaments. When not in use the hooked rods 5 are released from the eyes 17 and the member 8 is swung into the open frame. Any desired means may be provided for holding the member 8 in open position.

The simplicity of my construction and the advantages thereof will, it is believed, be perfectly apparent to those skilled in the art to which such invention relates when the foregoing description has been carefully read in connection with the drawing. It is, of course, to be understood that I do not wish to be restricted to the precise details herein set forth and hold myself entitled to such changes therefrom as fall within the scope of what I claim.

Having described the invention, I claim:—

1. In a device for the purpose set forth, a frame secured on a vertical support, a member hingedly secured to the base of the frame and designed, when swung outwardly therefrom to contact with the frame, said member having an outer V-shaped notch and a swingable gate on the member for closing the outer portion of the notch.

2. In a device for the purpose set forth, an open frame adapted to be fixedly secured to an upright support, a board hingedly secured to the lower member of the frame and designed to have its hinged end contact therewith when swung outwardly therefrom, said member having an outer V-shaped notch, a gate bar pivoted to the member adjacent one end thereof, and swingable over the notch, means carried by the member for adjustably engaging the gate bar to hold the same from outward swinging and swingably supported braces on the frame for engaging the member.

3. In a device for the purpose set forth, an open frame, adapted to be removably secured to an adjustable support, a board hingedly secured to the lower portion of the frame and designed to have its hinged end contact therewith when swung outwardly therefrom, said board having a V-shaped notch entering from its outer end, a gate bar comprising a cross sectional member which has its body portion arched and one of its ends secured adjacent to the outer end of the board, the opposite end of the board being provided with spaced apertures, a headed element adapted to pass through one of these apertures to engage the gate bar to hold the same from outward swinging, transverse reinforcing elements for the board, one of which having its ends formed with eyes, rods hingedly secured to the frame and having hooked ends to engage the eyes, and said board, when in inoperative position designed to be swung into the frame.

In testimony whereof I affix my signature.

PETER WILLIAM DETHLEFS.